United States Patent [19]

McCready

[11] 4,452,969

[45] Jun. 5, 1984

[54] POLY(ALKYLENE DICARBOXYLATE) PROCESS AND CATALYSTS FOR USE THEREIN

[75] Inventor: Russell J. McCready, Mt. Vernon, Ind.

[73] Assignee: General Electric Company, Schenectady, N.Y.

[21] Appl. No.: 502,434

[22] Filed: Jun. 9, 1983

[51] Int. Cl.$^3$ ....................... C08G 63/04; C08G 63/34
[52] U.S. Cl. .................................................. 528/279
[58] Field of Search ......................................... 528/279

[56] References Cited

U.S. PATENT DOCUMENTS 3,444,139  5/1969  Jeurissen et al. ..................... 528/279
4,148,989  4/1979  Tews et al. ..................... 528/296 X
4,260,735  4/1981  Bander et al. ......................... 528/279

FOREIGN PATENT DOCUMENTS 891679 12/1981 U.S.S.R. .

OTHER PUBLICATIONS

*Polymer Eng. & Science*, 22, pp. 229–233, (1982).
*Chem. Abstracts*, 83, 148316s, (1975).
*Chem. Abstracts*, 84, 44989t, (1976).
*J. Inorg. Nucl. Chem.*, 21, pp. 58–63, (1961).

*Primary Examiner*—Lucille M. Phynes
*Attorney, Agent, or Firm*—William H. Pittman; James C. Davis, Jr.; James Magee, Jr.

[57] ABSTRACT

Poly(alkylene dicarboxylates) such as poly(alkylene terephthalates) are prepared by reacting a dicarboxylic acid or alkyl ester thereof with an alkanediol in the presence of a titanium-containing chelate compound which may be prepared by the reaction of a tetraalkyl titanate with a substituted carboxylic acid derivative such as methyl salicylate, malic acid, glycine or dibutyl tartrate. Polymerization by this method minimizes ester-carbonate interchange in blends of the poly(alkylene dicarboxylates) with aromatic polycarbonates. A number of the chelates are novel compounds.

14 Claims, No Drawings

POLY(ALKYLENE DICARBOXYLATE) PROCESS AND CATALYSTS FOR USE THEREIN

This invention relates to an improved process for preparing poly(alkylene dicarboxylates) and compositions useful therein, and more particularly a process which employs an improved titanium-containing catalyst. In its broadest sense, the process of this invention is an improvement in a process for preparing poly(alkylene dicarboxylates) by the reaction of at least one dicarboxylic acid or alkyl ester thereof with at least one alkanediol in the presence of a titanium-containing catalyst; said improvement comprising using as said catalyst a compound having the formula

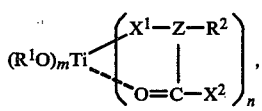
(I)

wherein:
each $R^1$ is an alkyl radical having up to about 20 carbon atoms;
$X^1$ is O or NH;
$X^2$ is $OR^3$ when $X^1$ is NH and is $OR^3$ or $NHR^3$ when $X^1$ is O;
Z is CH or a single-ring aromatic carbocylic radical in which the $-X^1-$ and

moieties occupy ortho positions;
$R^2$ is hydrogen or a lower hydrocarbon-based radical;
$R^3$ is hydrogen, lower alkyl or lower aryl;
n is 1 or 2; and
m is 4−n.

Blends of poly(alkylene dicarboxylates) and poly(arylene carbonates) (also known as aromatic polycarbonates and referred to hereinafter as "polycarbonates") are widely used in industry. A disadvantage of these blends, however, that inhibits their use to some degree is their tendency to undergo ester-carbonate interchange. In this interchange, ester linkages in both the polycarbonate and the poly(alkylene dicarboxylate) are broken and may be replaced by alkylene carbonate and aryl carboxylate bonds. The result is degradation of the physical properties of the polymer due to hybridization of the molecular linkages therein.

It has been suggested that ester-carbonate interchange is promoted by the presence in the poly(alkylene dicarboxylate) of traces of titanium compounds used to catalyze polymerization. Apparently these titanium compounds, chiefly tetraalkoxy titanates, are also effective in catalyzing a transesterification reaction between the polycarbonate and the poly(alkylene dicarboxylate).

A principal object of the present invention, therefore, is to provide an improved process for preparing poly(alkylene dicarboxylates).

A further object is to provide such a process employing a titanium-containing catalyst which does not promote ester-carbonate interchange when present in trace amounts in blends of the poly(alkylene dicarboxylate) with a polycarbonate.

Other objects will in part be obvious and will in part appear hereinafter.

The process of this invention is applicable to the preparation of poly(alkylene dicarboxylates) by the reaction of at least one alkanediol with at least one dicarboxylic acid or alkyl ester thereof. Typical alkanediols which may be used in this reaction are those having the formula HO—$R^4$—OH, wherein $R^4$ is a saturated divalent aliphatic or alicyclic hydrocarbon radical containing about 2-10 and usually about 2-6 carbon atoms. Illustrative radicals of this type are ethylene, propylene, trimethylene, tetramethylene, pentamethylene, hexamethylene and 1,4-cyclohexylene. The straight-chain radicals are preferred, especially ethylene, trimethylene and tetramethylene, but branched radicals are also contemplated.

The dicarboxylic acid may be an aliphatic acid such as succinic, glutaric, adipic, sebacic, azelaic or suberic acid, or an aromatic acid such as isophthalic or terephthalic acid. The aromatic acids, especially terephthalic acid, are preferred. The use of an alkyl ester, usually a lower alkyl ester, is especially preferred, the term "lower alkyl" denoting alkyl groups having up to 7 carbon atoms; it is most often a methyl, ethyl, or butyl ester. (The term "alkyl dicarboxylate" as used herein refers to the dialkyl ester.) Further suitable reagents for forming poly(alkylene dicarboxylates) are described in the following U.S. Pat. Nos. 2,465,319, 2,720,502, 2,727,881, 2,822,348, 3,047,539. The disclosures of these patents are incorporated by reference herein.

According to the present invention, the polyester-forming reaction is catalyzed by a titanium compound having formula I. In this formula the $X^1$ value may be either O (preferably) or NH. The $X^2$ value may be either $OR^3$ or $NHR^3$ and is always the former when $X^1$ is NH.

The $R^3$ value may be either hydrogen, lower alkyl (preferably) or lower aryl, the term "lower" denoting radicals having up to 7 carbon atoms. The most preferred $R^3$ values are hydrogen and methyl.

The Z value may be CH or a single-ring aromatic carbocyclic radical; i.e., a benzene ring on which the $R^2$, $-X^1-$ and

moieties are substituents. The last two of these moieties occupy ortho positions on the ring. The ring may also contain other substituents, provided they do not materially affect the character of the substituted carboxylic acid derivative for the purposes of this invention. However, it is usually unsubstituted other than by the previously enumerated moieties.

The $R^2$ value is either hydrogen or a lower hydrocarbon-based radical. The term "hydrocarbon-based radical" denotes both hydrocarbon and substituted hydrocarbon radicals, provided the substituents satisfy the above criterion. Most often, $R^2$ is either hydrogen or a lower alkyl or (especially) lower aryl radical which may contain substituents such as hydroxy, carboxy and carbalkoxy (the carbalkoxy radical usually being $COOR^3$).

The titanium compounds of formula I may be obtained by the reaction of a tetraalkyl titanate of the formula $(R^1O)_4Ti$ with a substituted carboxylic acid derivative of the formula

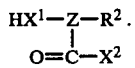

Illustrative compounds of formula II are methyl salicylate, ethyl salicylate, phenyl salicylate, salicylamide, glycine, malic acid, mandelic acid and dibutyl tartrate.

The reaction is normally effected by merely blending the titanate and substituted carboxylic acid derivative at a temperature in the range of about 20°–100° C. and agitating for a time sufficient for the reaction to take place. The molar ratio of substituted carboxylic acid derivative to tetraalkyl titanate is usually from about 1:1 to about 2.5:1; most often it is from 1:1 to 2:1 and preferably either 1:1 or 2:1 depending on whether the desired value of n in the product is 1 or 2. It is frequently convenient to effect the reaction in the presence of an organic solvent such as benzene, toluene, petroleum naphtha, hexane, ethanol, acetone, tetrahydrofuran or the like.

It is also within the scope of this invention to prepare the compound of formula I in situ during or just before the polymerization reaction. This is easily done by preparing a conventional reaction mixture for the preparation of poly(alkylene dicarboxylates), including a tetraalkyl titanate, and adding thereto a compound of formula II.

As indicated by formula I, the product of the reaction between the tetraalkyl titanate and the substituted carboxylic acid derivative is normally a chelate compound involving the carbonyl group in the ortho or alpha-position to the hydroxy radical. The chelate nature of the compound is an important aspect of the invention, since it is believed to account for the decreased activity of the titanium compound with respect to ester-carbonate interchange.

Novel compositions comprising titanium chelate compounds having the formula

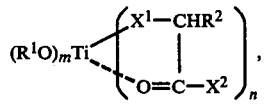

wherein $R^1$, $R^2$, $X^1$, $X^2$ and n are as previously defined, are another embodiment of the invention. Such compounds are prepared and used as described hereinabove.

In the process of this invention, the dicarboxylic acid or ester thereof, alkanediol and titanium-containing catalyst are heated in the range of about 180°–300° C. for a period of time sufficient to produce the desired poly(alkylene dicarboxylate). The mole ratio of diol to acid or ester is typically from about 1:1 to about 1.4:1 and preferably from about 1.2:1 to about 1.3:1, the excess diol being useful to drive the reaction to completion. The amount of titanium-containing catalyst used is typically about 0.005–0.2 percent by weight, based on the amount of acid or ester.

The preparation of the above-described titanium-containing catalysts, including the titanium chelate compounds of this invention, and their use in the process of this invention are illustrated by the following examples.

EXAMPLE 1

A benzene solution of 2.8 grams (10 mmol.) of tetraisopropyl titanate and 1.5 grams (10 mmol.) of methyl salicylate was heated to boiling and the benzene was removed by distillation. The residue was the desired chelate compound containing one methyl salicylate moiety per molecule.

EXAMPLE 2

The procedure of Example 1 was repeated except that 3.0 grams (20 mmol.) of methyl salicylate was used. The residue was the desired chelate compound containing 2 methyl salicylate moieties per molecule.

EXAMPLE 3

A mixture of 5.7 grams (20 mmol.) of tetraisopropyl titanate and 2.4 grams (20 mmol.) of salicylamide is stirred at room temperature for one hour and is then heated under vacuum at 75° C. The product is the desired chelate compound containing one salicylamide moiety per molecule.

EXAMPLE 4

The procedure of Example 1 is repeated, substituting glycine on an equimolar basis for the methyl salicylate. A similar product is obtained.

EXAMPLE 5

The procedure of Example 1 is repeated, substituting malic acid on an equimolar basis for the methyl salicylate. A similar product is obtained.

EXAMPLE 6

The procedure of Example 2 is repeated, substituting dibutyl tartrate on an equimolar basis for the methyl salicylate. A similar product is obtained.

EXAMPLE 7

A mixture of 100 grams of dimethyl terephthalate, 40 grams of ethylene glycol and 0.02 gram of the product of Example 1 is heated at 200°–210° C. in a nitrogen atmosphere, with stirring, as methanol is removed by distillation. After methanol evolution has ceased, the mixture is heated at 270°–280° C. for about 15 minutes and then under vacuum at the same temperature for about 40 minutes. The product is the desired poly(ethylene terephthalate).

EXAMPLE 8

A mixture of 100 grams of dimethyl terephthalate, 40 grams of ethylene glycol, 0.03 gram of tetraisopropyl titanate and 0.10 gram of methyl salicylate is heated at 300°–310° C. in a nitrogen atmosphere, with stirring, as methanol is removed by distillation. After methanol evolution has ceased, the mixture is heated at 270°–280° C. for about 15 minutes and then under vacuum at the same temperature for about 40 minutes. The product is the desired poly(ethylene terephthalate).

EXAMPLE 9

The procedure of Example 7 is repeated, substituting 1,4-butanediol on an equimolar basis for the ethylene glycol and 0.02 gram of the product of Example 2 for the product of Example 1. The product is the desired poly(tetramethylene terephthalate).

Blends of the poly(alkylene dicarboxylates) produced by the method of this invention with polycarbonates are significantly less susceptible to ester-carbonate interchange than similar previously known blends. It is believed that this is a result of the decreased tendency of the compounds of formula I to catalyze such interchange when present in poly(alkylene dicarboxylate)- polycarbonate blends. Said compounds are, however, sufficiently active to serve as effective catalysts for poly(alkylene dicarboxylate) preparation.

What is claimed is:

1. In a process for preparing poly(alkylene dicarboxylates) by the reaction of at least one dicarboxylic acid or alkyl ester thereof with at least one alkanediol in the presence of a titanium-containing catalyst, the improvement which comprising using as said catalyst a compound having the formula

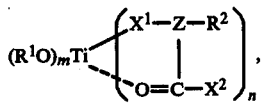 (I)

wherein:
each $R^1$ is an alkyl radical having up to about 20 carbon atoms;
$X^1$ is O or NH;
$X^2$ is $OR^3$ when $X^1$ is NH and is $OR^3$ or $NHR^3$ when $X^1$ is O;
Z is CH or a single-ring aromatic carbocyclic radical in which the —$X^1$— and

moieties occupy ortho positions;
$R^2$ is hydrogen or a lower hydrocarbon-based radical;
$R^3$ is hydrogen, lower alkyl or lower aryl;
n is 1 or 2; and
m is 4−n.

2. A process according to claim 1 wherein the dicarboxylic acid reagent is an alkyl ester of an aromatic dicarboxylic acid.

3. A process according to claim 2 wherein the alkane diol has the formula HO—$R^4$—OH, wherein $R^4$ is a saturated divalent aliphatic or alicyclic hydrocarbon radical containing about 2–10 carbon atoms.

4. A process according to claim 3 wherein $R^4$ is the ethylene, trimethylene or tetramethylene radical.

5. A process according to claim 4 wherein $X^1$ is O.

6. A process according to claim 5 wherein $X^2$ is $OR^3$ and $R^3$ is lower alkyl.

7. A process according to claim 6 wherein Z is a single-ring aromatic carbocyclic radical and $R^2$ is hydrogen.

8. A process according to claim 7 wherein $X^2$ is methoxy.

9. A process according to claim 8 wherein n is 1.

10. A process according to claim 9 wherein the alkyl ester is a lower alkyl terephthalate.

11. A process according to claim 10 wherein the terephthalate is methyl terephthalate.

12. A process according to claim 8 wherein n is 2.

13. A process according to claim 12 wherein the alkyl ester is a lower alkyl terephthalate.

14. A process according to claim 13 wherein the terephthalate is methyl terephthalate.

* * * * *